US012752457B2

(12) United States Patent
Oshima et al.

(10) Patent No.: US 12,752,457 B2
(45) Date of Patent: Oct. 6, 2026

(54) METHOD OF PRODUCING MANUFACTURED OBJECT AND MANUFACTURED OBJECT

(71) Applicant: CANON KABUSHIKI KAISHA, Tokyo (JP)

(72) Inventors: Kanako Oshima, Tokyo (JP); Hisato Yabuta, Machida (JP); Nobuhiro Yasui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 18/483,046

(22) Filed: Oct. 9, 2023

(65) Prior Publication Data

US 2024/0033968 A1 Feb. 1, 2024

Related U.S. Application Data

(60) Division of application No. 16/855,865, filed on Apr. 22, 2020, now Pat. No. 11,813,769, which is a (Continued)

(30) Foreign Application Priority Data

Oct. 27, 2017 (JP) ................................. 2017-208190
Oct. 24, 2018 (JP) ................................. 2018-200040

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 70/10* (2020.01); *B33Y 80/00* (2014.12);
(Continued)

(58) Field of Classification Search
None
See application file for complete search history.

(56) References Cited

U.S. PATENT DOCUMENTS 4,613,549 A * 9/1986 Tanaka .................. C04B 35/584 428/447
2008/0190034 A1* 8/2008 Rosenflanz ......... C04B 35/6261 501/48
(Continued)

FOREIGN PATENT DOCUMENTS

JP 2000211983 A * 8/2000 ............. C04B 1/009
JP 2017185527 A 10/2017

*Primary Examiner* — Seth Dumbris
(74) *Attorney, Agent, or Firm* — Canon U.S.A., Inc. IP Division

(57) ABSTRACT

A method of producing a manufactured object including forming the manufactured object by performing, once or a plurality of times, a step of forming a powder layer from material powders containing powders of an inorganic compound and a step of irradiating a predetermined region of a surface of the powder layer with an energy beam and thereby fusing/solidifying the material powders. In the step of fusing/solidifying the material powders, an amorphous-rich region and a crystalline-rich region are formed separately by changing at least one of an output of the energy beam, a relative position between the surface of the powder layer and a focus of the energy beam, and a scanning rate.

20 Claims, 9 Drawing Sheets

Related U.S. Application Data continuation of application No. PCT/JP2018/039988, filed on Oct. 26, 2018.

(51) Int. Cl.

| | |
|---|---|
| ***B33Y 70/10*** | (2020.01) |
| ***B33Y 80/00*** | (2015.01) |
| ***C04B 35/117*** | (2006.01) |
| ***C04B 35/64*** | (2006.01) |

(52) U.S. Cl.

CPC ............ *C04B 35/117* (2013.01); *C04B 35/64* (2013.01); *C04B 2235/3217* (2013.01); *C04B 2235/3224* (2013.01); *C04B 2235/6026* (2013.01); *C04B 2235/665* (2013.01)

(56) References Cited

U.S. PATENT DOCUMENTS

| | | | | |
|---|---|---|---|---|
| 2012/0202045 | A1* | 8/2012 | Mutsuda | C23C 28/04<br>427/446 |
| 2018/0086026 | A1* | 3/2018 | Nguyen | B32B 7/10 |
| 2018/0112577 | A1* | 4/2018 | Izumi | C04B 38/0006 |

* cited by examiner

METHOD OF PRODUCING MANUFACTURED OBJECT AND MANUFACTURED OBJECT

CROSS-REFERENCE TO RELATED APPLICATIONS

This application is a Divisional of U.S. application Ser. No. 16/855,865, filed Apr. 22, 2020, which is a Continuation of International Patent Application No. PCT/JP2018/039988, filed Oct. 26, 2018, which claims the benefit of Japanese Patent Application No. 2017-208190, filed Oct. 27, 2017, and Japanese Patent Application No. 2018-200040, filed Oct. 24, 2018, all of which are hereby incorporated by reference herein in their entirety.

BACKGROUND OF THE INVENTION

Field of the Invention

The present invention relates to a method of producing a manufactured object by using powders of an inorganic compound and a manufactured object, particularly, a method of producing a three-dimensional manufactured object and a three-dimensional manufactured object.

For making a trial product in a short time or producing a small number of parts, a technology of producing a desired manufactured object, particularly, a three-dimensional manufactured object by bonding material powders to each other with an energy beam while using a direct manufacturing system has been popular.

Japanese Patent Application Laid-Open No. H01-502890 describes a method of producing an article by using a so-called powder bed fusion method (powder bed fusion). This method includes repetition of a series of steps, that is, forming a powder layer composed of material powders on a substrate and selectively irradiating a portion of the powder layer corresponding to the cross-section of an article with an energy beam to sinter the powders. By the repetition of a series of steps, a sintered portion and a portion sintered subsequent thereto are bonded to each other and lastly, powders of an unsintered portion or an unnecessary portion of the sintered portion are removed to obtain a desired article.

The direct manufacturing system such as the powder bed fusion method enables formation of a three-dimensional manufactured object with accuracy in a short time because the object can be manufactured directly from powders without using a mold or shaving from an ingot. In addition, it has an advantage that a three-dimensional manufactured object having a complicated and fine shape can be obtained because it can be formed based on three-dimensional data created using a designing tool such as three-dimensional CAD and its design can be changed easily.

On the other hand, the three-dimensional manufactured object obtained using a direct manufacturing system inevitably has a surface with asperities due to adhesion and bonding of unnecessary material powders caused by heat transmitted from a portion of the surface irradiated with an energy beam. It is therefore necessary to process the surface during manufacturing or after manufacturing in order to obtain a three-dimensional manufactured object having a smooth surface.

Japanese Patent Application Laid-Open No. 2008-291315 discloses a method, in direct manufacturing system manufacture with metal powders, of reducing an amount of material powders to be attached and bonded and thereby shortening a machining and processing time of the surface. This method is however inferior in machining efficiency because a substance having a mechanical strength as high as that of a three-dimensional manufactured object is cut. Japanese Patent Application Laid-Open No. 2008-291315 also discloses a method of carrying out machining and processing while irradiating the surface of a three-dimensional manufactured object with an energy beam and thereby temporarily softening the surface. The material powders described in Japanese Patent Application Laid-Open No. 2008-291315 are made of a metal, so that the surface can be softened even with an energy beam of a low energy, but the present method is difficult to apply to an inorganic compound such as ceramics having a high melting temperature.

The heat applied by an energy beam to a first powder layer on the substrate reaches the substrate, so that the sintered portion is bonded to the substrate. Further, when an article having an overhang portion is produced, a support should be formed to prevent it from bending or dropping due to gravity.

When the substrate or support is unnecessary, it is removed from the three-dimensional manufactured object by processing such as machining when it becomes unnecessary. In the manufacture using powders of an inorganic compound such as ceramics, since a manufactured object thus obtained has a high mechanical strength, so that it inevitably takes much time to remove the support or separate the object from the substrate.

SUMMARY OF THE INVENTION

In one aspect of the present invention, there is provided a method of producing a manufactured object including forming the manufactured object by performing, once or a plurality of times, a step of forming a powder layer with material powders containing powders of an inorganic compound and a step of irradiating a predetermined region of a surface of the powder layer with an energy beam to fuse/solidify the material powders, wherein in the step of fusing/solidifying the material powders, an amorphous-rich region and a crystalline-rich region are formed separately by changing at least one of an output of the energy beam, a relative position between the surface of the powder layer and a focus of the energy beam, and a scanning rate.

In another aspect of the present invention, there is provided a method of producing a manufactured object including forming the manufactured object by scanning and irradiating a predetermined region with an energy beam, supplying material powders containing powders of an inorganic compound to a position irradiated with the energy beam, and thereby fusing/solidifying the material powders on a surface to be manufactured, wherein an amorphous-rich region and a crystalline-rich region are formed separately by changing at least one of an output of the energy beam, a relative position between the surface to be manufactured and a focus of the energy beam, and a scanning rate, depending on the irradiated region.

In a further aspect of the present invention, there is provided a manufactured object containing an inorganic compound and having a first region and a second region having a mechanical strength smaller than that of the first region, wherein at least a portion of a surface of the manufactured object includes the second region.

Further features of the present invention will become apparent from the following description of exemplary embodiments with reference to the attached drawings.

DESCRIPTION OF THE EMBODIMENTS

With a view to overcoming the above-described problem, the present invention has been completed. It provides a method of producing a manufactured object in a direct manufacturing system, which method is capable of forming a manufactured object having a necessary strength while efficiently removing an unnecessary portion.

[Three-Dimensional Manufacturing Apparatus]

Figure 11:
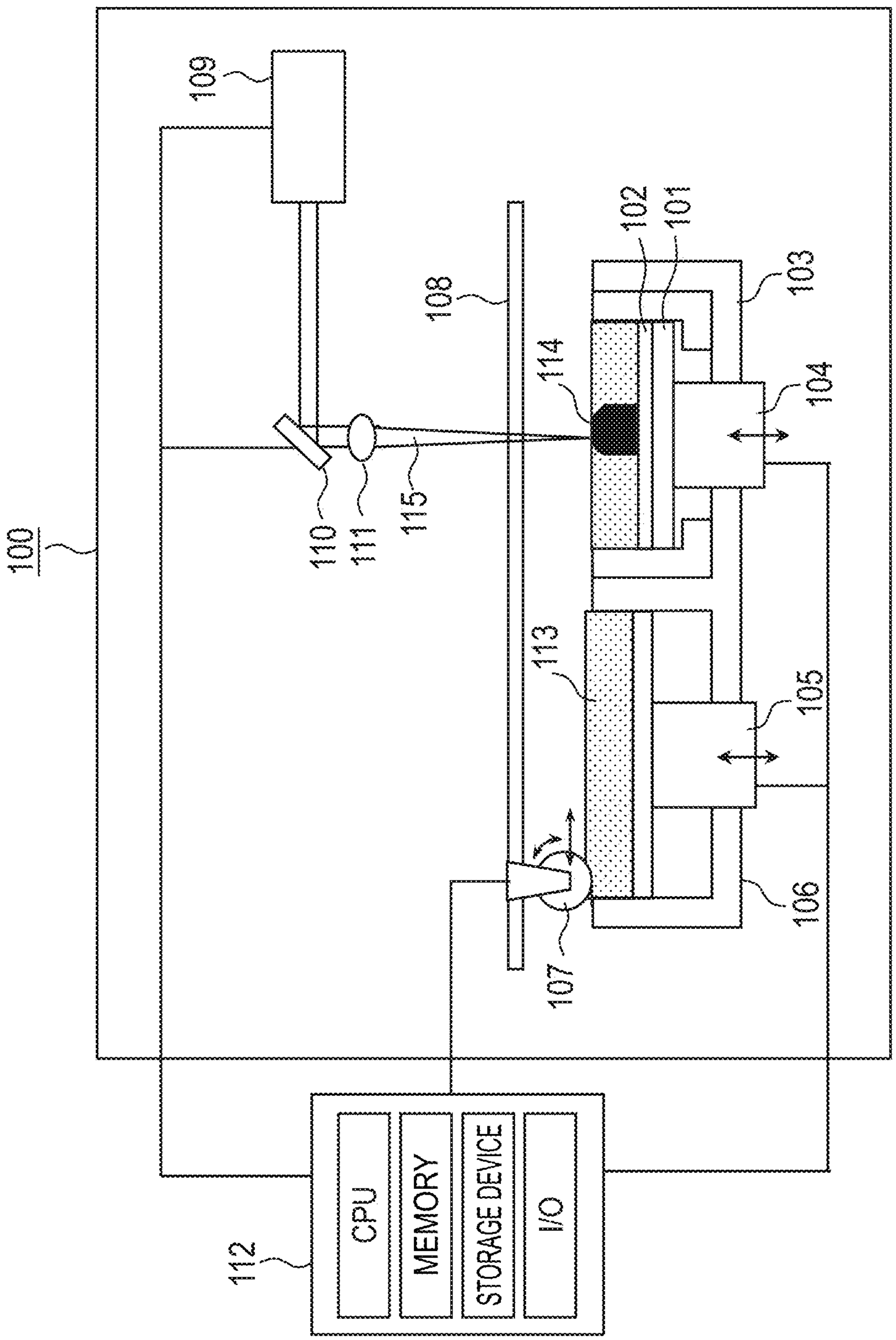
FIG. 11 is a schematic view for describing the constitution of a three-dimensional manufacturing apparatus.

First, a three-dimensional manufacturing apparatus 100 to be used in the present embodiment will be described referring to FIG. 11. A manufacturing table 101 is a table on which a plate 102 is mounted and it also serves as a bottom surface of a manufacturing vessel 103. The manufacturing table 101 has an unillustrated pin and by fitting it in an unillustrated pinhole of the plate 102, the position of the plate 102 is determined. The plate 102 has preferably a constitution to be fixed to the manufacturing table 101 with a screw. The plate is not necessarily sheet-shaped insofar as it functions as a supporting stand on which a three-dimensional manufactured object is to be formed. A positioning or fixing method of the plate on the manufacturing table is not limited to the above example. The manufacturing table 101 is supported movably in a vertical direction by a vertically moving mechanism 104.

Adjacent to the manufacturing table 101, placed are a powder supply vessel 106, a roller 107, a moving guide 108 for moving the roller 107, a laser light source 109, a scanner 110, and a condensing lens 111. The powder supply vessel 106 is a device for housing therein powders 113 for manufacturing and at the same time, for adjusting a supply amount of the powders 113 depending on the thickness of a powder layer to be deposited in the manufacturing vessel 103. The supply amount of the powders 113 can be adjusted by an increase in the height of a vertically moving mechanism 105. The roller 107 is supported by the moving guide 108 to enable horizontal movement. The powders for manufacturing are moved from the powder supply vessel 106 to the manufacturing vessel 104 and the surface of them is leveled to form a powder layer having a predetermined thickness. The laser light source 109, the scanner 110, and the condensing lens 111 constitute an irradiation optical system for place-selectively irradiating a raw material powder layer with a laser light 115.

A control unit 112 is a computer for controlling the operation of the three-dimensional manufacturing apparatus 100 and is equipped inside with a CPU, a memory, a storage device, an I/O port (input/output unit), and the like.

The memory is a random access memory (RAM), a read only memory (ROM), or the like. The storage device is a hard disk drive, a disk drive, a magnetic tape drive, or the like and it accommodates therein a program for achieving the processing of a flow chart which will be described later.

The I/O port is connected to an external device or network and data necessary for, for example, three-dimensional manufacturing can be input/output with an external computer. The data necessary for three-dimensional manufacturing include data of the shape of an object to be manufactured, information on materials used for manufacturing, and data of the shape of each of layers to be sintered, that is, slice data. The slice data may be received from an external computer or may be stored in a memory after being created by the CPU in the control unit 112 based on the data of the shape of a manufacturing model.

The CPU develops, in the memory, the program accommodated in the storage device, executes the program, and thereby allows the three-dimensional manufacturing device 100 to perform the processing of each step which will be described later.

The control unit 112 is connected to each member such as the vertically moving mechanism 104 of the manufacturing table, the vertically moving mechanism 105 on the bottom surface of the powder supply vessel 106, the roller 107, the laser light source 109, the scanner 110, and the condensing lens 111 and controls their operation to allow them to perform the processing relating to manufacturing.

Figure 1:
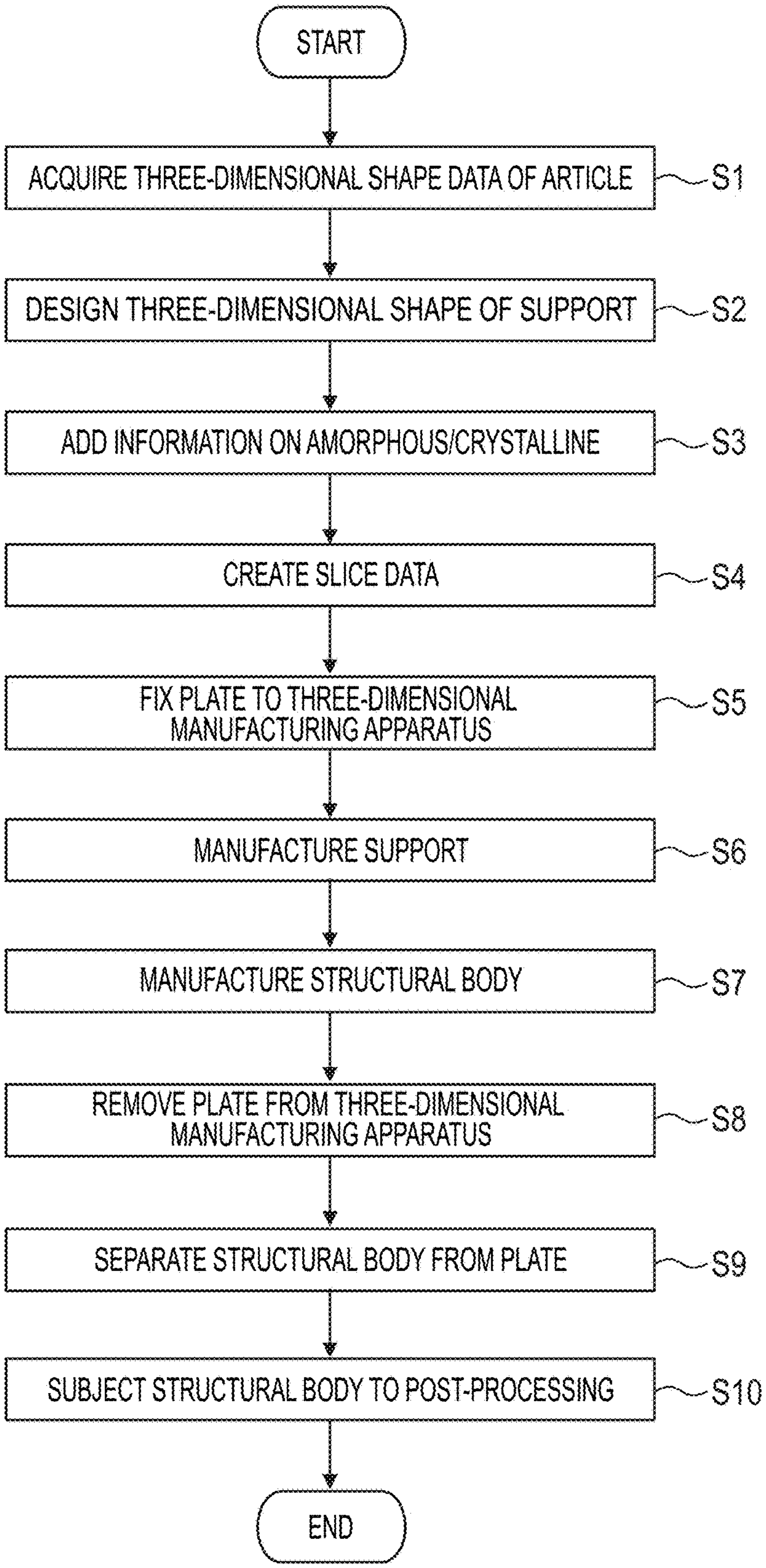
FIG. 1 is a schematic view showing a step flow in the method of producing a manufactured object according to the present invention.

The flow of the steps in the method of producing a manufactured object according to the present invention is shown in FIG. 1. The embodiment of the present invention will hereinafter be described along the flow of FIG. 1, but the present invention is not limited at all by the following specific examples.

(Outline of Steps)

After description of the entirety of the method of producing a manufactured object based on FIG. 1, characteristic portions of the present invention will be described. The CPU develops, in a memory, a program accommodated in a storage device and executes the program and thus achieves each of the steps of the method of producing a manufactured object which will be described hereinafter.

First, three-dimensional shape data of an article (manufacturing model) which is an object to be manufactured is acquired (Step S1). The three-dimensional shape data of the article is input from a 3DCAD or three-dimensional scanner through an I/O port of the control unit 112 and is then stored in the memory.

Next, based on the three-dimensional shape data of the article, a three-dimensional shape of a support for supporting a structural body when the structural body is formed using the three-dimensional manufacturing apparatus is designed (Step S2). In the present invention, the structural body corresponds to the three-dimensional shape data of a manufacturing model and the support corresponds to a portion added for assisting the manufacture of the structural body. The support is, more specifically, a structure which facilitates separation between the structural body and a plate after completion of the manufacturing or a structure for supporting, when the structural body has a hollow or overhang portion, its shape during manufacturing.

Then, information on amorphous/crystalline is added (Step S3). More specifically, information on which region is made amorphous-rich and which region is made crystalline-rich is added to the three-dimensional shape data obtained by adding the support to the manufacturing model. As will be described later in detail, a region including a boundary between the support and the structural body or a region of the support to be provided between the structural body and the plate including a first layer to be formed on the plate is designated as an amorphous-rich region and the other portion is designated as a crystalline-rich region. Alternatively, it is preferred to designate not only a portion of the support but also a region including the surface of the structural body as an amorphous-rich region.

The information on amorphous/crystalline can be added by inputting it to the control unit 112 through the I/O port. For example, a user may manipulate a mouse and set a region for the three-dimensional shape data indicated on an indicator unit connected to the I/O port and obtained by adding the support to the manufacturing model. Alternatively, the user may select a mode in which an amorphous-rich region and a crystalline-rich region are allocated respectively in advance, for example, a mode in which a region including a boundary between the support and the structural body is allocated to an amorphous-rich region and the other portion is allocated to a crystalline-rich region.

The amorphous-rich region or the crystalline-rich region is designated to have preferably a size of 100 $\mu m\varphi$ or more, more preferably a size of 200 $\mu m\varphi$ or more in a stacking direction and an in-plane direction, though depending on an irradiation diameter of an energy beam or a stacking pitch.

Next, shape data of respective layers necessary for the three-dimensional manufacturing apparatus 100 to stack them and thereby form a manufactured object, that is, slice data of the support and the structural body is created (Step S4).

In Step S1 to Step S4, the slice data created by the CPU of the control unit based on the three-dimensional shape data of the manufacturing model and the support may be stored in RAM or may be received through the I/O port after execution in an external computer. These respective steps can be omitted when the three-dimensional shape data including the support or the slice data are available as the data for manufacturing.

Next, the plate 102 is positioned and fixed in the three-dimensional manufacturing apparatus 100 (Step S5). The plate may be fixed prior to Steps S1 to S3.

Next, a support is manufactured on the plate 102 (Step S6). The three-dimensional manufacturing apparatus 100 forms material powders corresponding to one layer and then irradiates them with a laser light according to the slice data to form a solidified portion of the powder layer. After completion of the manufacture of the support, a structural body corresponding to a three-dimensional model is manufactured (Step S7) on the support. After completion of the manufacture, the plate 102 is removed from the three-dimensional manufacturing apparatus 100 (Step S8), the manufactured portion 114 is separated from the plate 102 (Step S9), and then post processing (Step S10) is performed if necessary to obtain an article corresponding to the manufacturing model.

Figure 2A:
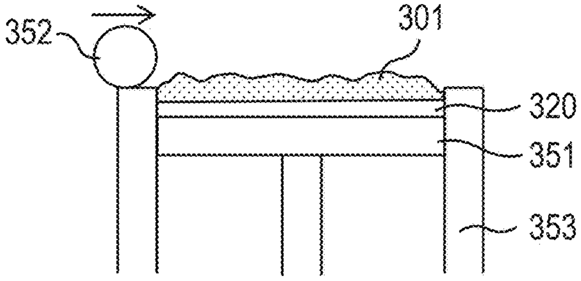
FIG. 2A is a schematic cross-sectional view schematically showing one embodiment of the method of producing a manufactured object according to the present invention.
Figure 2B:
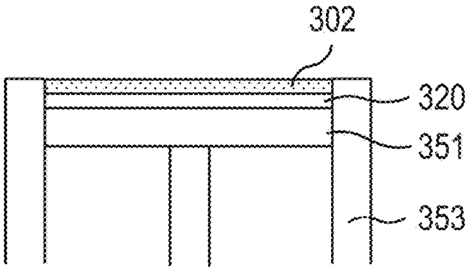
FIG. 2B is another schematic cross-sectional view schematically showing the one embodiment of the method of producing a manufactured object according to the present invention.
Figure 2C:
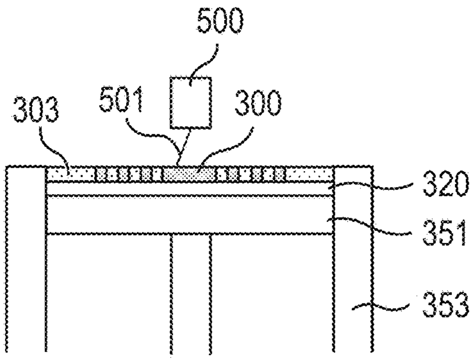
FIG. 2C is a further schematic cross-sectional view schematically showing the one embodiment of the method of producing a manufactured object according to the present invention.
Figure 2D:
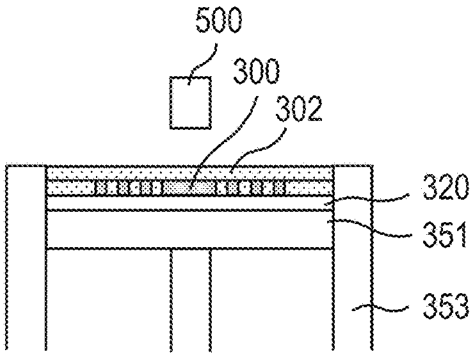
FIG. 2D is a still further schematic cross-sectional view schematically showing the embodiment of the method of producing a manufactured object according to the present invention.
Figure 2E:
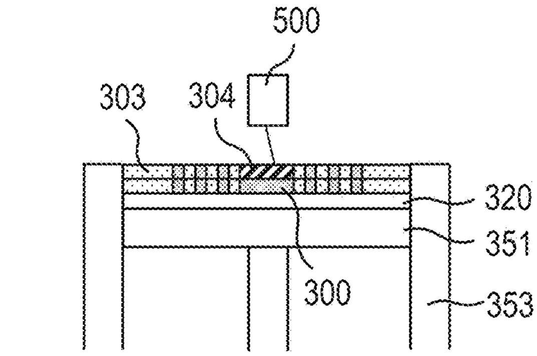
FIG. 2E is a still further schematic cross-sectional view schematically showing the one embodiment of the method of producing a manufactured object according to the present invention.
Figure 2F:
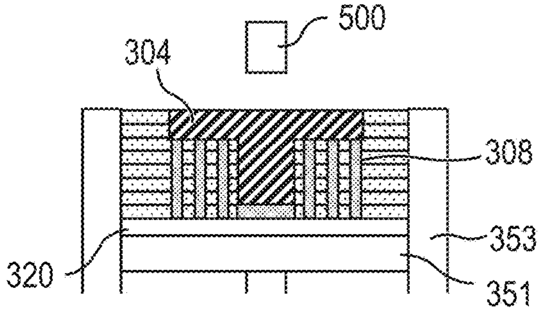
FIG. 2F is a still further schematic cross-sectional view schematically showing the one embodiment of the method of producing a manufactured object according to the present invention.

FIGS. 2A to 2H are schematic cross-sectional views schematically showing Steps S5 to S9 using a powder bed fusion system, a preferred embodiment of the method of producing a three-dimensional manufactured object according to the present invention. For the production, material powders 301 containing powders of an inorganic compound are used. First, a powder layer 302 made of the material powders 301 and having a predetermined thickness is formed on a substrate 320 using a roller 352 (FIGS. 2A and 2B). A step of scanning and irradiating the surface of the powder layer 302 with an energy beam 501 emitted from an energy beam source 500 based on slice data created from three-dimensional data of a manufacturing model and thereby selectively fusing/solidifying the material powders (FIG. 2C) is performed. By this step, a region (manufactured portion) 300 in which the material powders 301 have been fused and solidified and a region (non-manufactured portion) 303 in which they have remained as powders are formed (FIG. 2C). Then, a stage 351 is dropped to a position lower by a thickness corresponding to one powder layer from the upper edge of a manufacturing container 353 and a new powder layer 302 is formed to cover the manufactured portion 300 and the non-manufactured portion 303 (FIG. 2D). A series of the steps, that is, the step of forming the powder layer 302 and the step of scanning and irradiating the powder layer with the energy beam 501 and selectively fusing/solidifying the material powders is performed once or a plurality of times repeatedly (FIG. 2E). Thus, an integrated manufactured portion made of respective manufactured portions made of powder layers is formed (FIG. 2F).

Figure 2G:
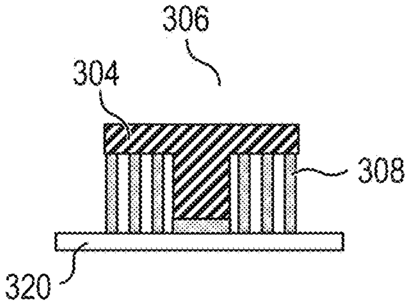
FIG. 2G is a still further schematic cross-sectional view schematically showing the one embodiment of the method of producing a manufactured object according to the present invention.
Figure 2H:
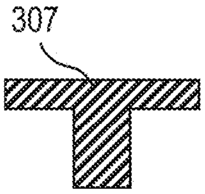
FIG. 2H is a still further schematic cross-sectional view schematically showing the one embodiment of the method of producing a manufactured object according to the present invention.

Next, the material powders are removed from the region (non-manufactured portion) 303 in which they have not been fused/solidified (FIG. 2G) and if necessary, a manufactured object 306 is subjected to post processing such as separation from the plate 320 or removal of the support to obtain a processed manufactured object 307 (FIG. 2H). In the drawing, a filling pattern of the manufactured portion 300 shows an amorphous-rich region and a filling pattern of the manufactured portion 304 shows a crystalline-rich region, which will be described later in detail.

(Material Powders)

The material powders to be used in the present invention are preferably ceramic powders. The term "ceramic" as used herein means an inorganic compound in solid form other than metals and a bonding state of the solid (crystalline or amorphous) can be neglected. The term "inorganic compound" as used herein means an oxide, nitride, oxynitride, carbide, or boride containing at least one element selected from an element group including antimony and bismuth as well as elements from Group I to Group XIV of the periodic table except hydrogen. Examples of ceramic powders usable as material powders include metal oxides and nonmetal oxides, nitrides, fluorides, borides, chlorides, and sulfides. The material powders may be composed of one inorganic compound or a mixture of two or more inorganic compounds. The term "ceramic powders" means powders composed mainly of ceramics and does not exclude those containing powders other than ceramics.

A three-dimensional manufactured object (which will hereinafter be called "manufactured object" simply) comprised mainly of ceramics has a mechanical strength higher than that of a resin or a metal.

The ceramic powders are preferably composed mainly of an oxide. Since the oxide has a volatile content smaller than that of another inorganic compound, the powders can be fused stably and at the same time, a crystalline-rich region and an amorphous-rich region can easily be formed separately. Typical examples of the oxide include aluminum oxide, zirconium oxide, magnesium oxide, and silicon oxide, and mixtures or compounds thereof.

Further, the ceramic powders contain more preferably aluminum oxide and zirconium oxide, or aluminum oxide and a rare earth oxide. These ceramic powders can be fused even by an energy beam with a small output because of having a melting point lower than that of typical ceramics. When the material powders are not fused fully, a manufactured object cannot be obtained. Although the output of an energy beam has a lower limit, use of the ceramic powders decreases the lower limit and expands a usable range of an output value. This facilitates control of a crystalline: amorphous ratio. In addition, manufacturing can be performed with a small output, so that unnecessary adhesion and bonding of material powders due to heat transfer from an energy beam irradiation portion is suppressed, leading to improvement in manufacturing accuracy.

A crystalline substance to be formed is not necessarily comprised of a single phase and has preferably a phase-separated structure having two or more phases. A crystalline substance having a phase-separated structure having two or more phases additionally demonstrates a function of suppressing the growth of a crack and providing a manufactured object having a further improved mechanical strength. Examples of the ceramic powders having a phase-separated structure having two or more phases include a eutectic composition mixture between aluminum oxide and zirconium oxide and a mixture between aluminum oxide and a rare earth oxide.

Use of a laser beam as the energy beam improves a manufacturing accuracy because the material powders absorb sufficient energy, heat is suppressed from spreading in the powder layer and spreads only locally, and an influence of heat on a non-manufactured portion decreases. For example, when an Nd-YAG laser is used, $Tb_4O_7$, $Pr_6O_{11}$, or the like showing good energy absorption to a YAG laser may be added to the material powders. From the above-described standpoint, examples of more preferable material powders include $Al_2O_3$—$ZrO_2$, $Al_2O_3$—$Gd_2O_3$, $Al_2O_3$—$Y_2O_3$, $Al_2O_3$—$Tb_4O_7$, $ZrO_2$—$Tb_4O_7$, $Y_2O_3$—$Tb_4O_7$, and $Gd_2O_3$—$Tb_4O_7$ and examples of still more preferable material powders include $Al_2O_3$—$Gd_2O_3$—$Tb_4O_7$, $Al_2O_3$—$ZrO_2$—$Tb_4O_7$, and $Al_2O_3$—$Y_2O_3$—$Tb_4O_7$.

The material powders to be used in the present invention may contain, in addition to the powders of an inorganic compound, a small amount (10 parts by weight or less based on 100 parts by weight of the powders of an inorganic compound) of a resin, a metal, or the like in order to control the fluidity of the powders or the performance of a final manufactured object.

(Formation of Powder Layer)

The following is one example of a preferred embodiment of a powder layer forming step in the present invention.

In the powder layer forming step, a powder layer is formed using material powders containing powders of an inorganic compound. In a step of forming a first powder layer on a substrate 320, a powder layer 302 having a predetermined thickness is formed as shown in FIG. 2B. In a step of forming a second or higher powder layer, a new powder layer 302 is formed on the powder layer 302 formed in the above step and a manufactured portion 300 (FIG. 2D). A method of forming the powder layer 302 is not particularly limited. It is recommended to form the powder layer 302 while defining a layer thickness with a roller 352, a blade, or the like as shown in FIG. 2A.

The powder bed fusion method has been described so far, but the manufacturing method of the present invention is not limited thereto. A manufactured object may also be formed by a directed energy deposition method (so-called cladding system) in which no powder layer is formed but material powders 301 are sprayed and supplied from a nozzle to a position irradiated with an energy beam to build up a manufacturing material on the surface of the substrate 320 or the manufactured portion 300 on which the object is manufactured.

(Fusion/Solidification of Material Powders)

A step (which will hereinafter be called a "fusion/solidification step", simply) of irradiating a predetermined region of the surface of the powder layer with an energy beam to fuse and solidify the material powders in the present invention will be described based on a preferable embodiment.

In the fusion/solidification step, the material powders are irradiated with an energy beam according to slice data and are fused/solidified. When the material powders are irradiated with an energy beam, the material powders absorb energy and due to heat converted from the energy, the material powders are fused. After completion of the irradiation with an energy beam, the fused material powders are cooled by a periphery adjacent to the fused portion and are solidified.

As shown in FIG. 2C, when the surface of the powder layer 302 formed on the substrate 320 is irradiated with an energy beam 501 while being scanned using a scanning mirror, the powders in a region irradiated with the energy beam 501 are fused/solidified with each other to form a manufactured portion 300. At this time, by adjusting the output of the energy beam 501 so that the heat applied to the manufacturing material reaches the interface between the substrate 320 and the powder layer 302, the substrate 320 and the manufactured portion 300 are bonded to each other. As shown in FIGS. 2D and 2E, by irradiating the powder layer 302 formed on the manufactured portion 300 with the energy beam 501, a new manufactured portion 304 is formed. At this time, the heat applied to the manufacturing material reaches the interface between the manufactured portion 300 formed first and the powder layer 302 formed subsequent thereto, so that the manufactured portion 300 formed first and the manufactured portion 304 newly formed are bonded to each other. The above-described fusion/solidification step is repeated to form an integrated manufactured object in which the manufactured portions formed in the powder layers, respectively, have been bonded to each other (FIG. 2F).

As the energy beam to be used, a light source having a proper wavelength is selected in consideration of the absorption characteristics of the material powders. For highly precise manufacturing, a laser beam or electron beam capable of having a narrowed beam diameter and therefore having high directivity is preferred. For the material powders containing oxide powders, a YAG laser or fiber laser having a 1 μm wavelength range or a $CO_2$ laser having a 10 μm wavelength range can be used.

In the present invention, at the time of irradiation with an energy beam in the fusion/solidification step, at least one of a relative position between the surface of the powder layer and the focus of the energy beam, output of the energy beam, and a scanning rate is changed depending on the irradiated region. This means that slice data include the information about which region is allocated to an amorphous-rich region and which region is allocated to a crystalline-rich region.

Irradiation with an energy beam after changing at least one of a relative position between the surface of the powder layer and the focus of the energy beam, output of the energy beam, and a scanning rate makes it possible to change a solidification rate of a fused material, that is, a cooling rate and thereby provide a manufactured portion having a changed mechanical strength. More specifically, an increase in the cooling rate provides an amorphous-rich region where a manufactured object has a relatively low mechanical strength, while a decrease in the cooling rate provides a crystalline-rich region where the manufactured object has a relatively high mechanical strength.

Figure 3A:
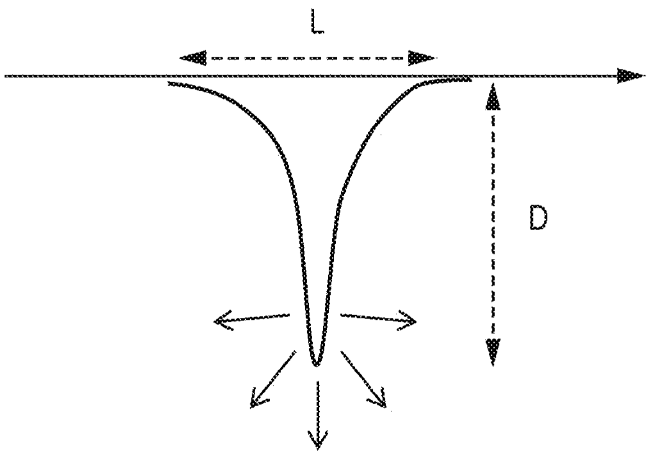
FIG. 3A is a view showing the shape of a fused portion, which fused portion is formed by scanning the powder layer with an energy beam once in one direction, at a cross-section vertical to the scanning direction of the beam.
Figure 3B:
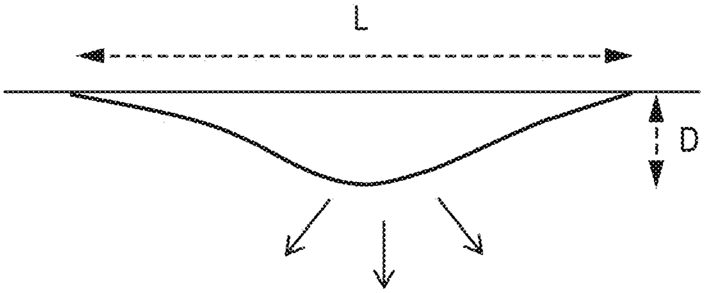
FIG. 3B is another view showing the shape of a fused portion, which fused portion is formed by scanning the powder layer with an energy beam once in one direction, at a cross-section vertical to the scanning direction of the beam.

The shape of the fused portion has a large influence on the cooling rate. FIGS. 3A and 3B show the shape of the fused portion (that is, solidified portion) at a cross-section vertical to the scanning direction of the beam. The fused portion (solidified portion) is formed by scanning the powder layer once in one direction with an energy beam. In these drawings, L means a fusion width (solidification width) in a direction vertical to the scanning direction and D means a fusion depth (solidification depth) from the surface in the irradiation direction. When the fused portion has a shape having a D/L larger than 1.0 as shown in FIG. 3A (sharp shape in the depth direction), it tends to become amorphous because the heat of the fused portion easily scatters in all the directions as shown by the arrows at the lower end of the drawing and a cooling rate increases. On the other hand, when the fused portion has a shape having a D/L not larger than 1.0 (shallow and mild (or gentle) shape) as shown in FIG. 3B, it tends to become crystalline because of less heat transfer and retardation in cooling rate as shown by the arrows at the lower end of the drawing. In short, the cooling rate of the fused portion largely depends on D/L.

The D/L representing the shape of the fused portion can be adjusted by a relative position between the surface of the powder layer and the focus of the energy beam. Irradiation with an energy beam, while focusing on the surface of the material powders makes an intensity profile in the energy beam steep and increases D/L. It results in an increase in cooling rate and therefore, the solidified portion becomes an amorphous-rich region.

The shape of the fused portion is also influenced by the output of an energy beam. With an increase in the output of the irradiation energy beam, D/L increases and at the same time, a quantity of heat added per unit area increases. Since the cooling rate is influenced more by D/L than by the quantity of heat added per unit area, the larger the output of the energy beam, the larger the D/L, and the higher the cooling rate. As a result, an amorphous-rich region can be formed.

The cooling rate can be adjusted also by the scanning rate of the energy beam. When the scanning rate of the energy beam is increased at a fixed D/L, a cooling rate increases due to a decrease in the quantity of heat added per unit area and the solidified portion tends to become amorphous. Retardation of the scanning rate of the energy beam increases the quantity of heat added per unit area and retards the cooling rate. As a result, the solidified portion tends to become crystalline-rich.

Accordingly, the crystalline-rich region and the amorphous-rich region can be formed separately by changing at least one of the output of the energy beam, the relative position between the surface of the powder layer and the focus of the energy beam, and the scanning rate. They can also be formed separately by using these parameters in combination.

When the output of the energy beam is decreased excessively, a fusion residue appears due to insufficient intensity. On the contrary, an excessive increase in the output of the energy beam sometimes fails to achieve a sufficient manufacturing accuracy due to excessive fusion. It is preferred to change either one or both of the scanning rate of the energy beam and the relative position between the surface of the powder layer and the focus of the energy beam to separately form a crystalline-rich region and an amorphous-rich region while achieving a manufacturing accuracy. The scanning rate has relation to a time necessary for the formation of a manufactured object. For the formation of a crystalline-rich region by changing the scanning rate, a decrease in scanning rate is required, which may retard a manufacturing rate. Changing the relative position between the surface of the powder layer and the focus of the energy beam without changing the scanning rate and thereby separately forming a crystalline-rich region and an amorphous-rich region is particularly preferred because it does not have a large influence on the manufacturing rate.

Conditions for achieving a D/L preferable for the formation of a crystalline-rich region and a D/L preferable for the formation of an amorphous-rich region differ, depending on the composition or particle diameter of the material powders, the constitution of a three-dimensional manufacturing apparatus, or the like. When a crystalline-rich region and an amorphous-rich region are formed, therefore, conditions are set respectively in advance for an output of an energy beam, a relative position between a surface to be manufactured and an energy beam, and a scanning rate.

Also in the directed energy deposition method, regions different in an amorphous/crystalline ratio can be formed separately by changing a cooling rate of the fused portion. More specifically, as in the powder bed fusion method, desired conditions can be introduced by changing at least one of the output of an energy beam, a relative position between a surface to be manufactured and the focus of an energy beam, and a scanning rate, depending on the region.

In the present invention, the crystalline substance and the amorphous substance formed by irradiation with an energy beam are made of the same inorganic compound powders, so that they have almost the same composition.

The quantity Q of heat added per unit area [J/mm$^2$] can be calculated from an output P [W], an irradiation diameter 2r [mm], and a scanning rate v [mm/s] (irradiation time T [s] at a scanning rate of 0). Supposing that the irradiation diameter is a point, a time necessary for an irradiation point having a scanning rate v [nm/s] to pass a unit length of 1 mm is 1/v [s]. The quantity Q of heat [J/mm$^2$] added can therefore be calculated using the following calculation formula: $Q=P/(\pi r^2 v)$. At a scanning rate of 0, the quantity of heat found using the irradiation time T [s] becomes $Q=PT/(\pi r^2)$. In the case of an electron beam, at an accelerated voltage of E [kV] and a beam current of I [mA], P=IE holds, leading to the following formula: $Q=IE/(\pi r^2\ v)$. At the scanning rate of 0, the quantity of heat found using the irradiation time T [s] becomes $Q=IET/(\pi r^2)$.

Figure 10:
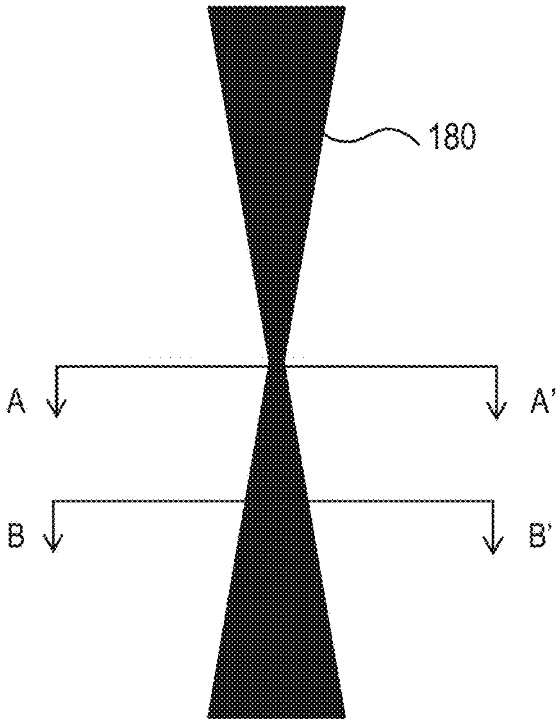
FIG. 10 is a schematic view for describing each of a focused state and an unfocused state of laser.

Separate formation of a crystalline-rich region and an amorphous-rich region is actualized by irradiating the surface of a powder layer with an energy beam under a focused state or an unfocused state, which will next be described in detail referring to the schematic view of FIG. 10. The shape of the fused portion can be changed and the cooling rate can be controlled by changing a state to a focused one or an unfocused one. For example, a laser beam 180 is designed to reach a powder layer while keeping an energy density high at the center portion of the beam by making use of an optical system (including fiber, lens, and the like) included in a laser beam source. The term "focused state" means that the surface of the powder layer is within a range of a focal depth of the laser beam 180, that is, a state where the surface of the powder layer is irradiated with a laser beam in the vicinity of the A-A' cross-section in FIG. 10. The term "unfocused state" means out of focus. The unfocused state is a state in which the focal position is shifted relative to the powder layer in order to attain a desired intensity profile of a laser beam on the powder layer, which will be described later. This means that the unfocused state in the present invention is only required to achieve a desired intensity profile of a laser beam and it includes a state where the surface of the powder layer is simply out of a focal position specified from the focal distance of a laser-focusing optical system of an apparatus used. As shown in FIG. 10, under the unfocused state, the surface of the powder layer is irradiated with a laser beam at the B-B' cross-section distant in either of the upper and lower directions from the A-A' cross-section passing through the focus point of the laser beam.

When the powder layer is irradiated with a laser beam under a focused state, the energy intensity profile of a beam spot focused on the powder layer shows a steep distribution and a D/L becomes large. This increases a cooling rate, leading to the formation of an amorphous-rich region.

When the powder layer is irradiated with a laser beam under an unfocused state, on the other hand, the energy intensity profile of a beam spot shows a mild distribution, different from that under a focused state, making it possible to avoid rapid cooling of the fused portion after laser irradiation. Formation of an amorphous substance due to rapid cooling can therefore be suppressed and as a result, crystalline-rich ceramic manufactured object can be obtained.

Next, a laser-beam irradiation method under an unfocused state will be described. For example, in an apparatus set to have a focused state on the surface of a powder layer, an unfocused state on the surface of the powder layer can be achieved by changing a stage height in a vertical direction. Alternatively, an unfocused state may be achieved not by changing a stage height but by driving an optical system included in a laser beam source or changing an optical system placed in an optical path to allow the energy intensity profile of a beam spot to have a gentle distribution.

For the formation of a crystalline-rich region, a D/L ratio in which (L) represents a fusion width of a solidified portion and (D) represents a fusion depth is preferably 1.0 or less, more preferably $0.2 \le D/L \le 0.7$. Laser beam irradiation under an unfocused state enables D/L to be 1.0 or less and as a result, 50 vol % or more of the solidified portion can be made crystalline. By increasing an unfocused degree, D/L can be made smaller. By adjusting D/L to 0.7 or less, 80 vol % or more of the solidified portion can be made crystalline. When D/L is less than 0.2, the fusion in the depth direction becomes insufficient and a bonding failure with an underlying layer sometimes occurs during layer stacking. The D/L is therefore preferably 0.2 or more.

On the other hand, D/L more than 1.0 is likely to form an amorphous substance by rapid cooling at the time of solidification. Laser beam irradiation under a focused state enables D/L to be more than 1.0 and as a result, 50 vol % or more of the solidified portion can be made amorphous. For increasing an amorphous percentage, D/L is preferably 1.2 or more. When D/L is 1.2 or more, 70 vol % or more of the solidified portion can be made amorphous. The D/L can also be changed by the output of an energy beam.

For the formation of one powder layer having both an amorphous-rich region and a crystalline-rich region mixed therein, it is recommended to form the entirety of either one of these regions included in the one layer and then form the entirety of the other region under changed irradiation conditions. In other words, in a step of fusing/solidifying material powders for forming one powder layer, provided is a first scanning stage for which conditions for the formation of a crystalline-rich region have been set. Then, provided is a second scanning stage for which conditions for the formation of an amorphous-rich region have been set so as to be different from those of the first scanning stage in at least one of the output of an energy beam, a relative position between a surface to be manufactured and the focus of the energy beam, and a scanning rate of the energy beam. The first scanning stage and the second scanning stage may be performed in any order. Manufacturing in such a way enables efficient manufacturing without frequently changing energy-beam irradiation conditions.

(Substrate)

As a material of the substrate to be used in the present invention, a proper one can be selected for use from materials such as metals and ceramics ordinarily used in the production of a manufactured object, in consideration of the intended use of the manufactured object, production conditions, and the like.

(Manufactured Object)

The manufactured object in the present invention is formed by performing, once or a plurality of times, a powder layer formation step and a fusion/solidification step and it has a region having a relatively high mechanical strength and a region having a relatively low mechanical strength. More specifically, the manufactured object is formed so that the main portion thereof has a relatively high mechanical strength and a boundary portion of the manufactured object between a portion to be removed and a portion not to be removed by processing treatment and a surface portion of the portion not to be removed have a relatively low mechanical strength. This makes it possible to efficiently remove the unnecessary portion of the manufactured object in the processing step of the manufactured object.

The relative mechanical strength of each portion of the manufactured object can be found from asperities formed during mechanical or chemical polishing of the manufactured object. In the manufactured object, a region (which will hereinafter be called "first region") having a relatively high mechanical strength protrudes after polishing and a region (which will hereinafter be called "second region") having a relatively low mechanical strength is recessed after polishing. Whether the region relatively protrudes or is recessed can be found, for example, by a three-dimensional measurement device, optical microscope, scanning electron microscope (SEM), or the like. The absolute value of the mechanical strength of each portion of the manufactured object can be found by carrying out an indentation test for the portion.

A manufactured portion 300 of a first layer is formed on the substrate 320 (FIG. 2C) by carrying out energy-beam irradiation under the conditions where the cooling rate of the fused portion becomes relatively high. In other words, manufacture of a first layer on the substrate 320 is performed by energy beam irradiation under conditions where D/L exceeds 1.0. Then, the surface of the substrate 320 is fused deeply along the shape of the fused portion and the substrate 320 and the first layer bond to each other strongly. Since a strong bond is formed between the substrate 320 and the first layer, release of the manufactured object 306 from the substrate 320 can be suppressed due to a stress applied to the interface between the substrate 320 and the manufactured object during the manufacturing step.

Then, a second region (manufactured portion 300) having a relatively low mechanical strength is formed between the manufactured object 306 and the substrate 320. This makes it possible to efficiently separate between the manufactured portion 304, which is a structural body, and the substrate 320 in the processing step of the manufactured object 306. When the manufactured object 306 includes a support 308 (FIG. 2G), manufacturing is performed while changing a cooling rate of the fused portion, depending on the region. More specifically, a region which will be a structural body and is required to have a high mechanical strength is irradiated with an energy bean under conditions where D/L becomes 1.0 or less in order to make the cooling rate of the fused portion relatively slow. Thus, a first region (manufactured portion 304) is provided. At least a region which will be a boundary portion between the manufactured portion 304 which is a structural body and the support 308 is irradiated with an energy beam under conditions where D/L exceeds 1.0 in order to make a cooling rate of the fused portion relatively high. Thus, a second region is provided. In the processing step of the manufactured object 306, therefore, the support 308 can be removed efficiently and the manufactured object 304 which is a structural body can be obtained. Needless to say, almost the entirety of the region which will be the support 308 may be formed as the second region.

Figure 4A:
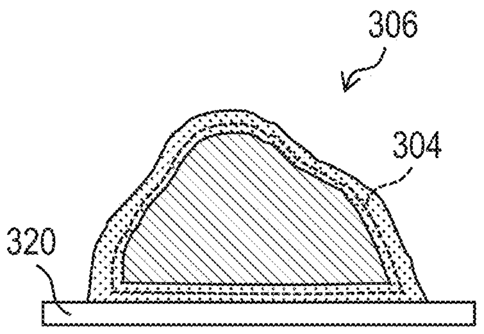
FIG. 4A is a schematic cross-sectional view for describing a manufactured object forming step and a processing step in the one embodiment of the method of producing a manufactured object of the present invention.
Figure 4B:
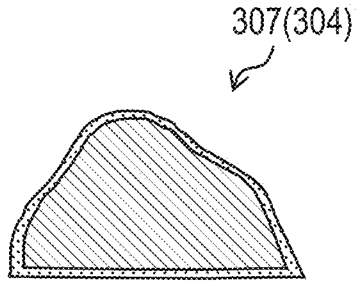
FIG. 4B is another schematic cross-sectional view for describing the manufactured object forming step and the processing step in the one embodiment of the method of producing a manufactured object of the present invention.

For surface processing of the manufactured object in the processing step of the manufactured object, energy beam irradiation is performed under conditions where D/L exceeds 1.0 to make the cooling rate of the fused portion relatively high in the region in the vicinity of the surface of the structural body. As shown in FIG. 4A, it is preferred to provide a portion of the manufactured portion 304 (region surrounded with a chain line), which is a structural body, including the surface thereof with the second region. The manufactured portion 304 serving as a major portion of the structural body is provided with the first region by energy beam irradiation under conditions where D/L becomes 1.0 or less. As a result, in the processing step of the manufactured object 306, the structural body can have a mirror surface by efficient machining-polishing (FIG. 4B). The outline of one example of a manufacturing process in this case will be described referring to FIGS. 5A to 5H.

Figure 5A:
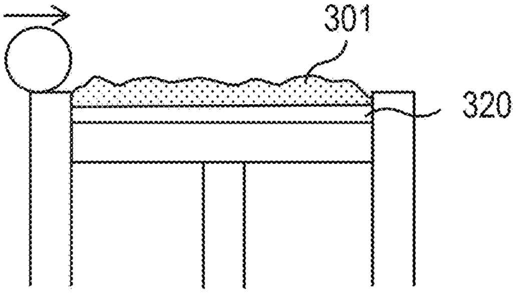
FIG. 5A is a schematic cross-sectional view for describing one example of a production process of one embodiment of the manufactured object of the present invention shown in FIGS. 4A and 4B.
Figure 5B:
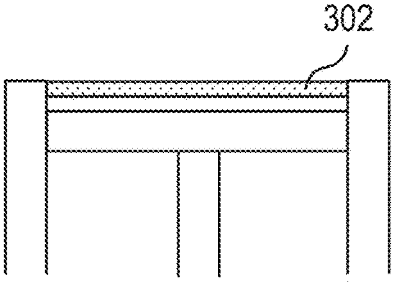
FIG. 5B is another schematic cross-sectional view for describing the one example of a production process of one embodiment of the manufactured object of the present invention shown in FIGS. 4A and 4B.
Figure 5C:
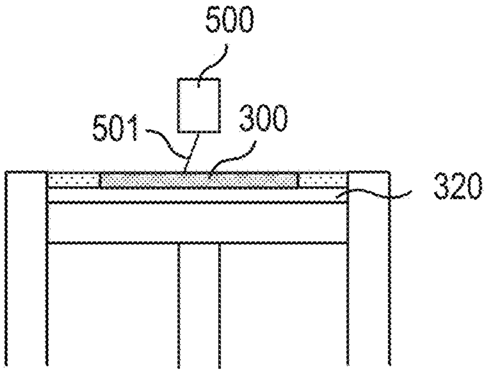
FIG. 5C is a further schematic cross-sectional view for describing the one example of a production process of one embodiment of the manufactured object of the present invention shown in FIGS. 4A and 4B.
Figure 5D:
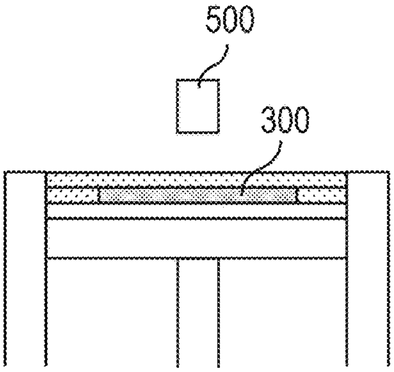
FIG. 5D is a still further schematic cross-sectional view for describing the one example of a production process of one embodiment of the manufactured object of the present invention shown in FIGS. 4A and 4B.
Figure 5E:
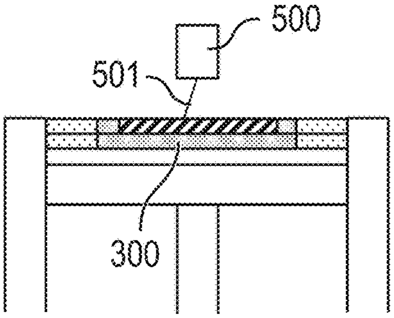
FIG. 5E is a still further schematic cross-sectional view for describing the one example of a production process of one embodiment of the manufactured object of the present invention shown in FIGS. 4A and 4B.

First, a first powder layer 302 is formed on a substrate 320 (FIGS. 5A and 5B) and a predetermined region of the surface of the powder layer 302 is irradiated with an energy beam 501 to fuse/solidify powders and form a manufactured portion 300 which is an amorphous-rich second region (FIG. 5C). The manufactured portion 300 which is the second region may be formed as a plurality of layers if necessary.

Then, another powder layer 302 is formed and is irradiated with a laser beam to provide a second region in a region including a portion which will be the surface of a manufactured object 306 and a portion which will be the surface of a structural body and a first region having a high mechanical strength in a manufactured portion 304 which will be the major portion of the structural body.

Figure 5F:
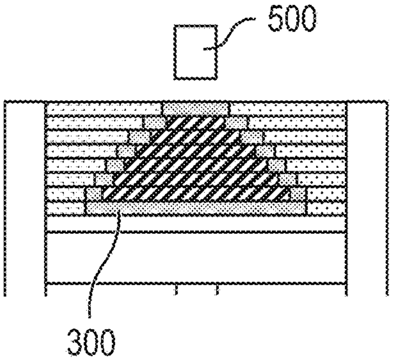
FIG. 5F is a still further schematic cross-sectional view for describing the one example of a production process of one embodiment of the manufactured object of the present invention shown in FIGS. 4A and 4B.
Figure 5G:
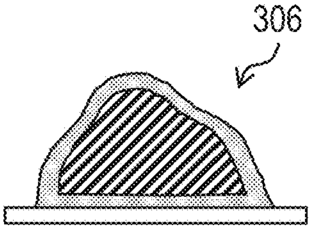
FIG. 5G is a still further schematic cross-sectional view for describing the one example of a production process of one embodiment of the manufactured object of the present invention shown in FIGS. 4A and 4B.
Figure 5H:
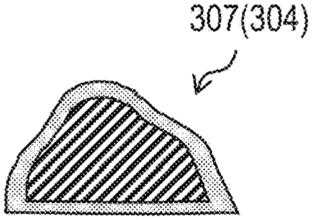
FIG. 5H is a still further schematic cross-sectional view for describing the one example of a production process of one embodiment of the manufactured object of the present invention shown in FIGS. 4A and 4B.

A series of these steps is performed successively once or a plurality of times (FIGS. 5D to 5F) and a manufactured object 306 having, integrated therein, the manufactured portions each made of the powder layer is formed (FIG. 5F). Next, the material powders are removed from a non-fused/non-solidified (non-manufactured portion) region (FIG. 5G), followed by post-processing such as separation of the manufactured object 306 from the substrate 320 or partial removal of the second region from the surface of the manufactured portion 306, if necessary, to obtain a structural body 307 (FIG. 5H).

The manufactured object is comprised of a crystalline substance and an amorphous substance. The crystalline substance means a solid substance having a crystal structure. The amorphous substance means a solid substance assembled without forming a crystal. Whether a substance is crystalline or amorphous can be found by X-ray diffraction, electron beam diffraction, or the like. In particular, whether a substance is crystalline or amorphous can be found easily by using an electron backscatter diffraction (EBSD) detector loaded on SEM. When a Kikuchi pattern is detected by the EBSD detector, the substance is determined as crystalline, while when this pattern is not detected, the substance is determined as amorphous.

The second region of the manufactured object is mainly composed of an amorphous substance. The effect of the present invention can be exhibited sufficiently even if both an amorphous substance and less than 30 vol % of a crystalline substance are present as a mixture in the second region. In other words, 70 vol % or more of the second region is amorphous. When a crystalline substance has a phase-separated structure comprised of two or more phases, an interface (phase boundary) between phases is amorphous from which no Kikuchi pattern is detected. To find the volume percentage of the crystalline substance, the volume of the phase boundary is also included in the volume of the crystalline substance. The volume percentage of the amorphous substance and the crystalline substance may be regarded as equal to the area percentage of the amorphous substance and the crystalline substance found by X-ray diffraction or electron beam diffraction of the cross-section of the manufactured object. An atom-atom bond is weaker in the amorphous substance than the crystalline substance so that the former has a mechanical strength lower than that of the crystalline substance. Since the second region is amorphous-rich, an unnecessary portion can be processed efficiently in the processing step of the manufactured object and at the same time, the manufactured object thus obtained has a high manufacturing accuracy and high mechanical strength.

When the method of producing a three-dimensional manufactured object according to the present invention is used, the cooling rate of a fused portion is changed, by changing, depending on the irradiated region, at least one of a relative position between the surface of the powder layer and the focus of an energy beam, the output of the energy beam, and a scanning rate. By this, a crystalline/amorphous ratio in a desired portion of the manufactured object can be changed to control the mechanical strength of each region.

More specifically, when the cooling rate of the fused portion is high, the percentage, in the manufactured object, of an amorphous substance having a relatively low mechanical strength increases, while when the cooling rate is low, the percentage of a crystalline substance having a relatively high mechanical strength increases. As described above, the cooling rate is largely influenced by the shape of the fused portion. The fused portion having a deep and sharp shape increases the cooling rate and the resulting object is likely to be amorphous. On the other hand, the fused portion having a shallow and mild shape decreases the cooing rate and the resulting object is likely to be crystalline. The shape of the fused portion can be adjusted by a relative position between the surface of the powder layer and the focus of the energy beam or the output of the energy beam.

The cooling rate can also be adjusted by a quantity of heat added per unit area. In order to finely control a crystalline/amorphous ratio, it is preferred to adjust the output of an energy beam or a focal position to a predetermined value, change a scanning rate and then, adjust a quantity of heat added per unit area.

(Processing of Manufactured Object)

The processing of a manufactured object is performed by removing material powders from a non-manufactured portion and then removing a support (unnecessary portion) included in the manufactured object. Prior to the removal of the support, unsolidified material powders are taken out and collected. This makes it possible to reuse the material powders thus collected for the formation of a powder layer because mixing of removed dusts in the material powders can be prevented. After removal of the unnecessary portions, processing dusts which have attached to the surface are removed by washing or the like. Then, a processed manufactured object can be obtained.

The manufactured object may be processed a plurality of times during a process for obtaining a desired three-dimensional manufactured object as follows: a new powder layer is formed on the processed manufactured object and irradiated with an energy beam to form a new manufactured object integrated with the processed manufactured object and then, the resulting manufactured object is processed again.

In the processing of the manufactured object, a support body (region to be removed) of the manufactured object preferably includes a region (second region) having a relatively low mechanical strength. Such a region has a relatively low mechanical strength, so that an unnecessary portion can be removed efficiently. The advantageous effect of the present invention can be obtained sufficiently if at the time of removing the unnecessary portion, a site subjected to processing such as machining, cutting, polishing or chemical etching is comprised of the second region. Therefore, only a portion of the unnecessary portion may be comprised of the second region.

For example, a three-dimensional manufactured object is formed on a substrate preferably by providing a portion of the manufactured object 306 contiguous to the substrate 320 with the second region as shown in FIGS. 2F and 2G. This enables the manufactured object 306 to be separated from the substrate 320 efficiently by a wire saw or the like. When the manufactured object 306 includes the support 308, at least a portion of the support 308 contiguous to the structural body 304 and a portion of the support contiguous to the substrate 320 are preferably provided with the second region. This enables efficient removal of the support 308 by using machining, cutting, chemical etching, or the like. Further, for processing of the surface of the structural body, a region of the structural body 304 including the surface thereof is preferably provided with the second region as shown in FIG. 4A. This makes it possible to efficiently machine-polish the surface of the structural body to obtain a mirror surface (FIG. 4B).

(Manufactured Object)

It is preferred that 80 vol % or more of the structural body of the manufactured object of the present invention is crystalline. The manufactured object having such a structure has a high mechanical strength and excellent durability. A crystalline-rich region can be obtained by changing, at the time of energy beam irradiation, at least one of the output of the energy beam, the relative position between the surface of the powder layer and the focus of the beam, and the scanning rate, depending on the irradiated region and thereby retarding the cooling rate at the time of solidification. In this case, the manufactured object is designed and formed so that 80 vol % or more of the manufactured object after removal of an unnecessary portion by the processing of the manufactured object becomes crystalline. The volume percentage of the crystalline substance in the structural body can be regarded as equal to an area percentage of the crystalline substance found by X-ray diffraction or electron beam diffraction of the cross-section of the manufactured object.

The structural body of the present invention, when analyzed at two or more positions in the vicinity of the center of any cross-section of the structural body, has a crystalline substance and an amorphous substance at each of these analyzed positions and vol % or more of the structural body is preferably composed of the crystalline substance.

Further, the crystalline substance has preferably a phase-separated structure having two or more phases. The crystalline substance having a phase-separated structure suppresses growth of a crack, leading to formation of a three-dimensional manufactured object having a further improved mechanical strength. Presence or absence of the phase-separated structure can be found easily by using SEM-EBSD or the like.

As shown in FIG. 4B, the second region may remain on the surface of the processed manufactured object 307. Addition of a strong impact to a structural body composed of a polycrystalline inorganic compound may cleave a bond at a grain boundary, cause peeling-off of crystal grains, and form a chip on the surface of the manufactured object. Presence of the second region on the surface of the processed manufactured object 307 is effective for preventing a chip.

EXAMPLES

The method of manufacturing a three-dimensional manufactured object and a three-dimensional manufactured object according to the present invention will hereinafter be described in detail by Examples. The present invention is however not limited at all by the following Examples.

In the following Examples 1 to 8, a crystalline-rich region and an amorphous-rich region are formed separately by changing the scanning rate of a laser and changing the quantity of heat to be added per unit area.

Example 1

After $\alpha$-$Al_2O_3$ powders, $Gd_2O_3$ powders, and $Tb_2O_{3.5}$ powders ($Tb_4O_7$ powders) were provided, they were each weighed to satisfy the following equation $Al_2O_3$:$Gd_2O_3$:$Tb_2O_{3.5}$=77.4:20.8:1.8 in terms of molar ratio. After the weighed powders were ground and mixed for 24 hours in a wet ball mill charged with an ethanol solvent, the ethanol was removed to obtain mixed powders (material powders).

Next, a manufactured object of Example 1 was formed by a step essentially similar to that shown in FIGS. 2A to 2H.

Figure 6A:
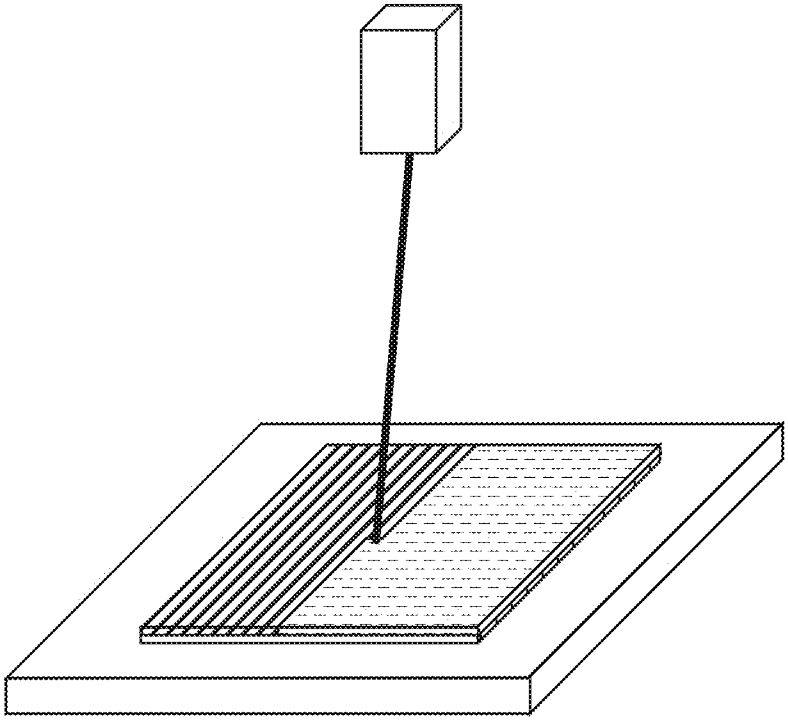
FIG. 6A is a schematic perspective view showing a laser irradiation procedure in Example 1 of the present invention and also showing the manufactured object of Example 1.
Figure 6B:
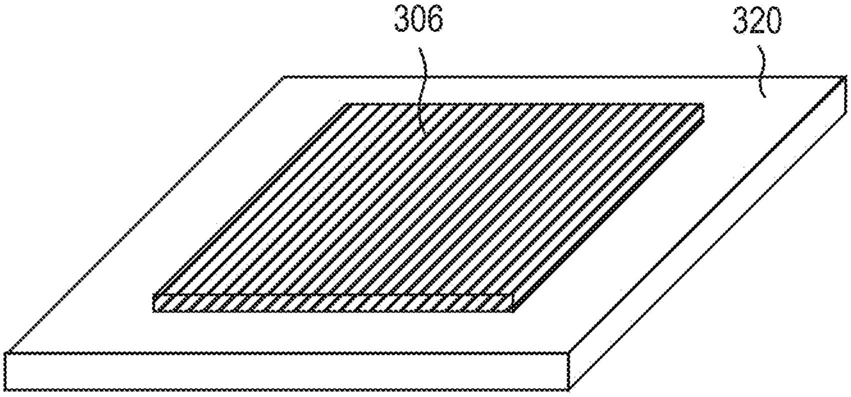
FIG. 6B is another schematic perspective view showing a laser irradiation procedure in Example 1 of the present invention and also showing the manufactured object of Example 1.

First, a 20-μm thick powder layer composed of the above mixed powders was formed on an alumina substrate with a roller. Then, the powder layer was irradiated with a Yb fiber laser ($\lambda$=1070 nm) by a laser beam machine using YLR-300-SM (trade name; product of IPG Photonics Japan) to fuse/solidify the mixed powders. The laser was output at 30 W, with an irradiation diameter of 100 μmφ at a scanning rate of 200 mm/s. The relative position between the surface of the powder layer and the focus of the laser can be adjusted by the height of a stage on which the substrate and the powder layer are placed. In the present example, the stage height was adjusted to a position—1.0 mm from a focusing position. Fifty 5-mm long lines were formed in parallel with a pitch of 100 μm and an about 5-mm square manufactured portion was formed (refer to FIG. 6A). Next, a powder layer having a thickness of 20 μm was formed with a roller to cover the manufactured portion. The powder layer right above the lines was irradiated with a laser orthogonally to the lines to form 50 lines similarly. Such steps were repeated to form a manufactured object 306 in which manufactured portions corresponding to 10 layers in total were integrated was formed on the substrate 320 as shown in FIG. 6B.

As a result of calculation of a quantity Q of heat added per unit area based on the laser irradiation conditions, Q was found to be about 19 [J/mm$^2$].

Next, after removal of the powders at a non-manufactured portion, the manufactured object 306 integrated with the substrate 320 was buried in a resin and by using a diamond blade, a crude cross-section was obtained. The crude cross-section thus obtained was polished with waterproof polishing paper and diamond slurry, followed by chemical etching with an alkaline solution to mirror finish the surface.

The cross-section sample thus obtained was fixed to a sample carrier of SEM with a conductive paste and a carbon film of about 3 nm was vapor deposited to the polished surface. The resulting sample was then analyzed by SEM observation, EBSD analysis, and energy-dispersive X-ray spectroscopy (EDX) analysis.

Figure 9:
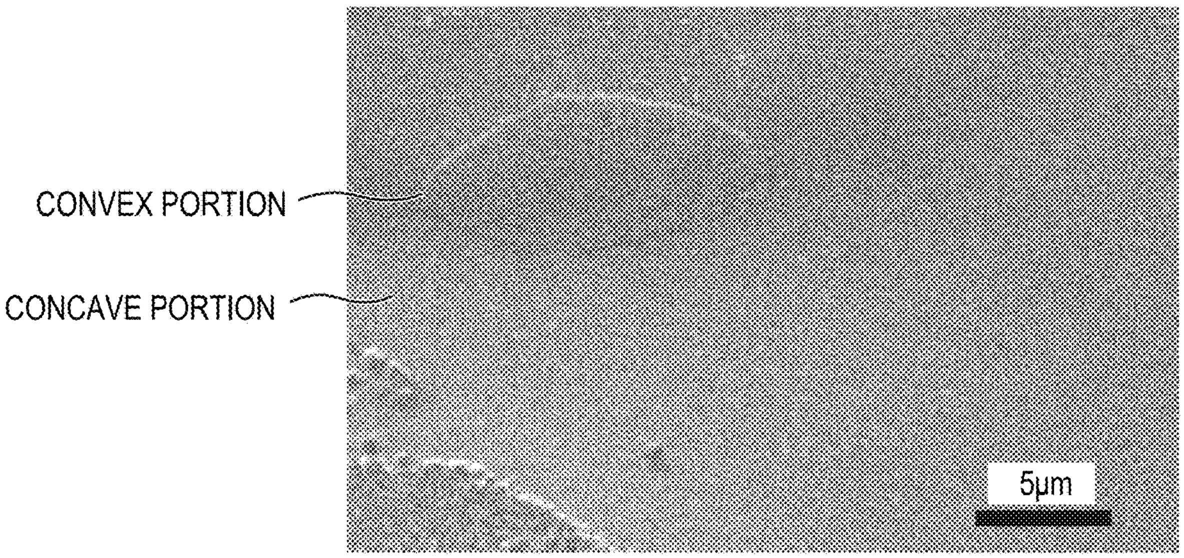
FIG. 9 is an SEM image showing a polished cross-sectional surface of the manufactured object of Example 1.

The manufactured object 306 had a thickness of about 62 μm. It had, at the cross-section thereof, asperities attributable to polishing and chemical etching. A plurality of SEM images was obtained and a proportion of concave portions and convex portions of the whole cross-section (about 60 μm×about 5 mm) of the manufactured object was studied. As a result, of the whole cross-section of the manufactured object except void portions, the concave portions accounted for 88 area % and the convex portions accounted for 12 area %. A void percentage of the cross-section of the manufactured object was calculated from the same SEM images. Supposing that the whole cross-section of the manufactured object including voids was 100 area %, the void percentage was 3 area %. FIG. 9 shows an SEM image of the polished surface.

Next, the cross-section of the manufactured object was subjected to EBSD analysis. From the convex portions, two Kikuchi patterns showing a corundum structure and a perovskite structure were detected, which revealed that the convex portions were crystalline and had a phase-separated structure comprised of a corundum structure phase and a perovskite structure phase. From the concave portions, on the other hand, no Kikuchi pattern was obtained. The results suggested that the concave portions were amorphous. Further, the convex portions were subjected to EDX analysis and then, Al and O were detected from the corundum structure phase and Gd, Tb, Al, and O were detected from the perovskite structure phase, which revealed that the convex portions were comprised of $\alpha$-$Al_2O_3$ and (Gd,Tb)$AlO_3$.

Example 2

In a manner similar to that of Example 1 except that the scanning rate of the laser was set at 50 mm/s, a manufactured object was formed. A quantity Q of heat added per unit area was calculated from the laser irradiation conditions and Q was found to be about 76 [J/mm$^2$].

In a manner similar to that of Example 1, the manufactured object thus obtained was analyzed. The manufactured object had a thickness of about 60 μm. Of the cross-sectional area of the manufactured object except void portions, convex portions accounted for 98 area % and concave portions accounted for 2 area %. EBSD analysis revealed that the convex portions were crystalline and the concave portions were amorphous. In addition, EBSD analysis and EDX analysis revealed that the crystalline substance had a phase-separated structure comprised of $\alpha$-$Al_2O_3$ and (Gd,Tb)$AlO_3$. Further, supposing that the cross-sectional area of the manufactured object including the void portions was 100 area %, the void percentage was 5 area %.

Example 3

In a manner similar to that of Example 1 except that the scanning rate of the laser was set at 100 mm/s, a manufactured object was formed. A quantity Q of heat added per unit area was calculated from the laser irradiation conditions to find that Q was about 38 [J/mm$^2$].

In a manner similar to that of Example 1, the manufactured object thus obtained was analyzed. The manufactured object had a thickness of about 61 μm. Of the cross-sectional area of the manufactured object except void portions, convex portions accounted for 34 area % and concave portions accounted for 66 area %. EBSD analysis revealed that the convex portions were crystalline and the concave portions were amorphous. In addition, EBSD analysis and EDX analysis revealed that the crystalline substance had a phase-separated structure comprised of $\alpha$-$Al_2O_3$ and (Gd,Tb)$AlO_3$. Further, supposing that the cross-sectional area of the manufactured object including the void portions was 100 area %, the void percentage was 4 area %.

Example 4

In a manner similar to that of Example 1 except that the scanning rate of the laser was set at 150 mm/s, a manufactured object was formed. A quantity Q of heat added per unit area was calculated from the laser irradiation conditions to find that Q was about [J/mm$^2$].

In a manner similar to that of Example 1, the manufactured object thus obtained was analyzed. The manufactured object had a thickness of about 62 μm. Convex portions accounted for 15 area % and concave portions accounted for 85 area %, each of the cross-sectional area of the manufactured object except void portions. EBSD analysis revealed that the convex portions were crystalline and the concave portions were amorphous. In addition, EBSD analysis and EDX analysis revealed that the crystalline substance has a phase-separated structure comprised of $\alpha$-$Al_2O_3$ and (Gd, Tb)$AlO_3$. Further, supposing that the cross-sectional area of the manufactured object including the void portions was 100 area %, the void percentage was 3 area %.

Figure 7:
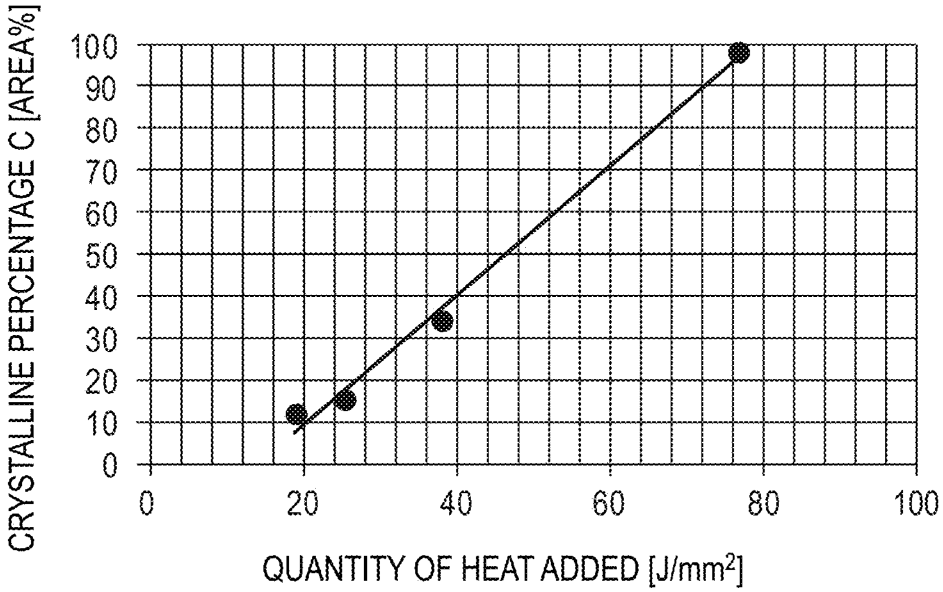
FIG. 7 is a graph showing the relationship between a quantity of heat added and a crystalline percentage in Examples 1 to 4 of the present invention.
Figure 8:
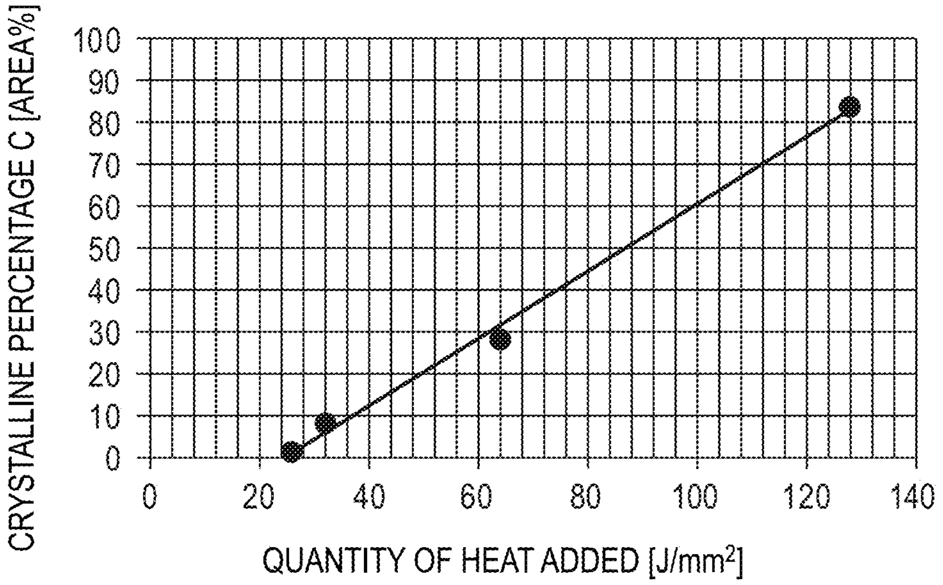
FIG. 8 is a graph showing the relationship between a quantity of heat added and a crystalline percentage in Examples 5 to 8 of the present invention.

The results of Examples 1 to 4 are shown in FIG. 7. The graph of FIG. 7 shows a relationship between a quantity Q of heat [J/mm$^2$] added (abscissa) and a crystalline percentage C [area %] (ordinate). Q and C roughly have a proportional relation and can be approximated by a relational expression such as C=A×Q+B (with the proviso that A and B are each a constant). An approximate formula for the relation between Q and C was introduced from the results of Examples 1 to 4 by using the least squares method to obtain the following approximate formula: C=1.4×Q−17 (which will hereinafter be called "Formula 1").

Example 5

In a manner similar to that of Example 1 except that $\alpha$-$Al_2O_3$ powders were used as the inorganic compound powders, and the output of the Yb laser was set at 40 W, and the laser scanning rate was set at 40 mm/s, a manufactured object was formed. A quantity Q of heat added per unit area was calculated from the laser irradiation conditions to find that Q was about 127 [J/mm$^2$].

In a manner similar to that of Example 1, the manufactured object thus obtained was analyzed. The manufactured object had a thickness of about 67 μm. Of the cross-sectional area of the manufactured object except void portions, convex portions accounted for 84 area % and concave portions accounted for 16 area %. EBSD analysis revealed that the convex portions were crystalline and the concave portions were amorphous. In addition, EBSD analysis and EDX analysis revealed that the crystalline substance was $\alpha$-$Al_2O_3$. Further, supposing that the cross-sectional area of the manufactured object including the void portions was 100 area %, the void percentage was area %.

Example 6

In a manner similar to that of Example 5 except that the laser scanning rate was set at 80 mm/s, a manufactured object was formed. A quantity Q of heat added per unit area was calculated from the laser irradiation conditions to find that Q was about 64 [J/mm$^2$].

In a manner similar to that of Example 5, the manufactured object thus obtained was analyzed. The manufactured object had a thickness of about 66 μm. Of the cross-sectional area of the manufactured object except void portions, convex portions accounted for 28 area % and concave portions accounted for 72 area %. EBSD analysis revealed that the convex portions were crystalline and the concave portions were amorphous. In addition, EBSD analysis and EDX analysis revealed that the crystalline substance was $\alpha$-$Al_2O_3$. Further, supposing that the cross-sectional area of the manufactured object including the void portions was 100 area %, the void percentage was 4 area %.

Example 7

In a manner similar to that of Example 5 except that the laser scanning rate was set at 160 mm/s, a manufactured object was formed. A quantity Q of heat added per unit area was calculated from the laser irradiation conditions to find that Q was about 32 [J/mm$^2$].

In a manner similar to that of Example 5, the manufactured object thus obtained was analyzed. The manufactured object had a thickness of about 66 μm. Of the cross-sectional area of the manufactured object except the area of void portions, convex portions accounted for 8 area % and concave portions accounted for 92 area %. EBSD analysis revealed that the convex portions were crystalline and the concave portions were amorphous. In addition, EBSD analysis and EDX analysis revealed that the crystalline substance was $\alpha$-$Al_2O_3$. Further, supposing that the cross-sectional area of the manufactured object including the void portions was 100 area %, the void percentage was 4 area %.

Example 8

In a manner similar to that of Example 5 except that the laser scanning rate was set at 200 mm/s, a manufactured object was formed. A quantity Q of heat added per unit area was calculated from the laser irradiation conditions to find that Q was about 25 [J/mm²].

In a manner similar to that of Example 5, the manufactured object thus obtained was analyzed. The manufactured object had a thickness of about 66 μm. Of the cross-sectional area of the manufactured object except void portions, convex portions accounted for 1 area % and concave portions accounted for 99 area %. EBSD analysis revealed that the convex portions were crystalline and the concave portions were amorphous. In addition, EBSD analysis and EDX analysis revealed that the crystalline substance was $\alpha$-$Al_2O_3$. Further, supposing that the cross-sectional area of the manufactured object including the void portions was 100 area %, the void percentage (area of voids) was 3 area %.

The results of Examples 5 to 8 are shown in FIG. 7. A relation between a quantity Q of heat added [J/mm²] and a crystalline percentage C [area %] was found from the graph of FIG. 7 to obtain the following approximate formula: $C=0.81\times Q-20$.

A laser was used in Examples 1 to 8 but an electron beam can be used instead. A crystalline substance and an amorphous substance can also be formed separately by changing, instead of the scanning rate, an irradiation diameter or output (an accelerated voltage and a beam current instead of the output in the case of an electron beam) and thereby changing the quantity of heat added per unit area.

Comparative Example 1

In a manner similar to that of Example 1 except the laser scanning rate was set at 5 mm/s, a manufactured object was formed. As a result, the quantity of heat added per unit area was about 764 [J/mm²] and too large, so that fusion of the mixed powders spread over a wide range, leading to a marked deterioration in manufacturing accuracy.

Comparative Example 2

In a manner similar to that of Example 1 except the laser scanning rate was set at 1000 mm/s, a manufactured object was formed. As a result, the quantity of heat added per unit area was about 4 [J/mm²] and too small, so that the mixed powders were not fused/solidified sufficiently.

Comparative Example 3

In a manner similar to that of Example 5 except the laser scanning rate was set at 5 mm/s, a manufactured object was formed. As a result, the quantity of heat added per unit area was about 1019 [J/mm²] and too large, so that fusion of the mixed powders spread over a wide range, leading to a marked deterioration in manufacturing accuracy.

Comparative Example 4

In a manner similar to that of Example 5 except the laser scanning rate was set at 1000 mm/s, a manufactured object was formed. As a result, the quantity of heat added per unit area was about 5 [J/mm²] and too small, so that the mixed powders were not fused/solidified sufficiently.

The results of Examples 1 to 8 and Comparative Examples 1 to 4 are shown together in Table 1.

TABLE 1

| | Inorganic compound powders $Al_2O_3$:$Gd_2O_3$:$Tb_2O_{3.5}$ | Laser output (W) | Laser scanning rate (mm/s) | Quantity Q of heat added per unit area (J/mm²) | Intermediate molded object | |
|---|---|---|---|---|---|---|
| | | | | | Crystalline percentage (area %) | Crystalline composition |
| Ex. 1 | 77.4:20.8:1.8 | 30 | 200 | 19 | 12 | $\alpha$-$Al_2O_3$,(Gd,Tb)$AlO_3$ |
| Ex. 2 | 77.4:20.8:1.8 | 30 | 50 | 76 | 98 | $\alpha$-$Al_2O_3$,(Gd,Tb)$AlO_3$ |
| Ex. 3 | 77.4:20.8:1.8 | 30 | 100 | 38 | 34 | $\alpha$-$Al_2O_3$,(Gd,Tb)$AlO_3$ |
| Ex. 4 | 77.4:20.8:1.8 | 30 | 150 | 25 | 15 | $\alpha$-$Al_2O_3$,(Gd,Tb)$AlO_3$ |
| Ex. 5 | 100:0:0 | 40 | 40 | 127 | 84 | $\alpha$-$Al_2O_3$ |
| Ex. 6 | 100:0:0 | 40 | 80 | 64 | 28 | $\alpha$-$Al_2O_3$ |
| Ex. 7 | 100:0:0 | 40 | 160 | 32 | 8 | $\alpha$-$Al_2O_3$ |
| Ex. 8 | 100:0:0 | 40 | 200 | 25 | 1 | $\alpha$-$Al_2O_3$ |
| Comp. Ex. 1 | 77.4:20.8:1.8 | 30 | 5 | 764 | Wide spreading of fusion of powders and marked deterioration in manufacturing accuracy | |
| Comp. Ex. 2 | 77.4:20.8:1.8 | 30 | 1000 | 4 | Insufficient hardening of powders | |
| Comp. Ex. 3 | 100:0:0 | 40 | 5 | 1019 | Wide spreading of fusion of powders and marked deterioration in manufacturing accuracy | |
| Comp. Ex. 4 | 100:0:0 | 40 | 1000 | 5 | Insufficient hardening of powders | |

In Examples 9 to 22, a crystalline substance and an amorphous substance were formed separately by changing the output of a laser beam and the relative position between the surface of a powder layer and the focus of the laser beam and thereby changing the shape of the fused portion of material powders.

The relative position between the surface of a powder layer and the focus of the laser beam can be adjusted by changing the height of a stage on which a substrate and the powder layer are placed. Since the state of the laser beam does not change by unfocusing even if as to the stage height, the surface of the powder layer is on a plus side (side closer to a scanning mirror of the laser beam) from a focusing position or is on a minus side (side distant from the scanning mirror of the laser beam) therefrom, study was made only on the minus side in the present examples.

Examples 9 and 10

After spherical $\alpha$-$Al_2O_3$ powders (average particle diameter: 20 μm), spherical $Gd_2O_3$ powders (average particle diameter: 25 μm), and $Tb_4O_7$ powders (average particle diameter: 3 μm) were provided and they were weighed to satisfy the following equation: $Al_2O_3$:$Gd_2O_3$:$Tb_4O_7$=2.10: 2.00:0.18 in terms of mass ratio. The weighed powders were mixed for 30 minutes in a dry ball mill to obtain mixed powders (material powders).

In order to find the amount of an organic component contained in the mixed powders, the powders were heated in an electric furnace of 400° C. for 12 hours and a weight change before and after heating was measured. A weight loss was found to be less than 0.5 wt %. In addition, a weight change before and after heating was measured by heating them in an electric furnace of 800° C. for 12 hours. A weight loss was found to be less than 1.0 wt %.

For the formation of a manufactured object, ProX DMP 100 (trade name), product of 3D SYSTEMS equipped with a 50-W fiber laser (beam diameter: 65 μm) was used.

First, a first powder layer composed of the above material powders and having a thickness of 30 μm was formed with a roller on a substrate made of alumina. Then, with such a constitution that the sample of Example 9 was placed on a portion of the alumina substrate and that of Example 10 was placed on the same base table so as not to overlap with each other, a 6×6 mm-square region of the powder layer of the sample of Example 9 was irradiated with a laser beam of 20 W at a focusing position (stage height: −1.5 mm in the present apparatus) at a rate of 100 mm/s with a pitch of 100 μm in a square filling manner to cause fusion/solidification (second scanning stage). On the other hand, a 6×6 mm-square region of the powder layer of the sample of Example 10 was irradiated with a laser beam of 30 W at a non-focusing position (stage height: −5.0 mm in the present apparatus) at a rate of 140 mm/s with a pitch of 100 μm in a square filling manner to cause fusion/solidification (first scanning stage). Drawing lines were made parallel to each side of the square. Next, a 20-μm thick powder layer was formed newly with a roller so as to cover the fused-solidified portion therewith. The powder layer right above the respective square regions of the sample of Example 9 and the sample of Example 10 was irradiated with a laser under conditions similar to the above-described ones so as to be orthogonal to the drawing lines of the first layer to fuse and solidify the powders in the 6×6 mm region. The second or higher powder layers had a thickness fixed to 20 μm.

By such a repeating step, manufactured objects each having a bottom surface of 6×6 mm and a height of 6 mm were formed. As a drawing procedure, the drawing was repeated until a final manufactured object had a desired thickness, while rotating the drawing line by 90° whenever the (n)th layer, (n+1)th layer, (n+2)th layer, (n+3)th layer, and the like were stacked one after another in order of mention.

The manufactured objects obtained in Examples 9 and 10 were separated from the alumina substrate and with the connected portion with the substrate as the bottom surface, the manufactured objects were cut and polished at a vertical surface parallel to the side surface to obtain observation samples, respectively. The samples were observed by EBSD and image capture of an IQ map was performed. The IQ map is a two-dimensional image obtained by digitizing the sharpness of a Kikuchi pattern available from a region irradiated with an electron beam. At this time, a signal can be obtained from a crystalline region but not from an amorphous region and this can be utilized for finding which portion of the manufactured object is amorphous and which portion is crystalline.

A crystalline percentage of the sample of Example 9 in the observation visual field was 20 area %. A crystalline percentage of the sample of Example 10 in the observation visual field was 96 area %.

To measure the fused shape of the powder layer when irradiated with a laser beam, a 30 μm-thick powder layer was formed on a base table as in the formation of the manufactured object of Example 9 and the powder layer was subjected to linear one-line irradiation with a laser beam under the irradiation conditions of Example 9. The cross-sectional shape of the line fused and solidified by the irradiation was observed and the shape was digitized using a D/L ratio, a ratio of a depth (D) to a width (W) in a direction vertical to the line of the portion fused/solidified while biting the alumina substrate. Under the conditions of Example 9, D/L became 1.29. Similarly, the cross-sectional shape of a line drawn under the conditions of Example 10 was evaluated to find that D/L was 0.32.

Examples 11 to 22

The stage height, the output of a laser beam, and the scanning rate were set according to the conditions shown in Table 2 and manufactured objects of Examples 11 to 22 were formed and evaluated as in Example 9. The D/L ratio and the crystalline percentage of each Example are shown in Table 2.

Comparative Example 5

In a manner similar to that of Example 9 except that the stage height, the output of a laser beam, and the scanning rate were set at −7.0 mm, 20 W, and 100 mm/s, respectively, a comparative manufactured object of Comparative Example 5 was formed and evaluated. As a result, sufficient fusion of the material powders did not occur under the conditions of the present Comparative Example, leading to a failure in line drawing and formation of a manufactured object.

TABLE 2

| | Stage height (mm) | Laser output (W) | Laser scanning rate (mm/s) | D/L | Crystalline percentage (area %) |
|---|---|---|---|---|---|
| Ex. 9 | −1.5 | 20 | 100 | 1.29 | 20 |
| Ex. 10 | −5.0 | 30 | 140 | 0.32 | 96 |
| Ex. 11 | −1.5 | 30 | 100 | 1.67 | 13 |
| Ex. 12 | −1.5 | 40 | 100 | 1.76 | 11 |
| Ex. 13 | −5.0 | 20 | 100 | 0.16 | 92 |
| Ex. 14 | −5.0 | 25 | 100 | 0.22 | 98 |
| Ex. 15 | −5.0 | 30 | 100 | 0.38 | 96 |
| Ex. 16 | −5.0 | 40 | 100 | 0.61 | 88 |
| Ex. 17 | −3.0 | 20 | 100 | 0.66 | 89 |
| Ex. 18 | −3.0 | 30 | 100 | 1.39 | 23 |
| Ex. 19 | −3.0 | 40 | 100 | 1.62 | 15 |
| Ex. 20 | −4.0 | 40 | 100 | 1.07 | 41 |
| Ex. 21 | −3.0 | 25 | 100 | 0.97 | 74 |
| Ex. 22 | −7.0 | 40 | 100 | 0.26 | 99 |
| Comp. Ex. 5 | −7.0 | 20 | 100 | Unmeasurable | Unmeasurable |

<Conclusion>

As in Examples 1 to 8, a crystalline substance and an amorphous substance can be formed separately by changing the scanning rate of a laser beam and thereby adjusting a quantity of heat added per unit are and controlling a cooling rate at the time of solidification.

As in Examples 9 to 22, a crystalline substance and an amorphous substance can be formed separately by changing the output or the focal position of a laser beam and thereby controlling a fused shape (D/L) and controlling a cooling rate at the time of solidification.

In Examples 9, 11, and 12, laser beam irradiation was performed under a focused state. As a result, D/L becomes 1.2 or more, a crystalline percentage is as low as 20 area % or less, and an amorphous percentage becomes high. In Examples 13 to 16 and 21, laser beam irradiation was performed under an unfocused state. As a result, D/L becomes less than 1.0 and a crystalline percentage becomes as high as 70 area % or more. In Examples 13 to 16, D/L becomes less than 0.7 and the crystalline percentage becomes as high as 80% or more.

The focal position is set equal in Examples 17 and 18, but a crystalline percentage is large in Example 17 where the output of a laser beam is small and a crystalline percentage is small in Example 18 where the output is high.

For example, by forming a support under conditions as those in Example 9 and forming a manufactured object under conditions as those in Example 10, the support can be removed efficiently.

In addition, by fusing/solidifying a powder layer right above a substrate under conditions as those in Example 9 and forming a manufactured object on it under conditions as those in Example 10, the manufactured object can be separated from the substrate efficiently.

Further, a manufactured object having a crystalline inside and an amorphous surface layer can be obtained by forming the surface layer of the manufactured object under conditions as those in Example 9 and the inside of the manufactured object under conditions as those in Example 10. This facilitates processing of the surface layer of the manufactured object while keeping the strength of the manufactured object and is effective for suppressing a phenomenon of losing a crystal grain at a crystal boundary when the manufactured object has a polycrystalline inside.

The present invention can be achieved by allowing a three-dimensional manufacturing apparatus to perform the above-described respective steps. More specifically, a system including a three-dimensional manufacturing apparatus or a three-dimensional manufacturing apparatus is supplied with a program for performing operations of the above-described embodiment via a network or various storage media. The system including a three-dimensional manufacturing apparatus or a computer (CPU or the like) of a three-dimensional manufacturing apparatus reads out the program and allows the three-dimensional manufacturing apparatus to run the program.

INDUSTRIAL APPLICABILITY

The present invention can be used in a direct manufacturing system as a method of producing a manufactured object capable of efficiently removing an unnecessary portion while forming a manufactured object with a desired strength.

The present invention is not limited by the above embodiments and various changes or modifications can be made without departing from the spirit and scope of the present invention. The following claims are therefore attached to make the scope of the present invention public.

The present invention makes it possible to provide a method of producing a manufactured object in a direct-manufacturing system, which method is capable of efficiently remove an unnecessary portion while producing a manufactured object having a desired strength.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A three-dimensional manufactured object comprising:
a first region which includes, in per unit area having a size of 100 umφ or more, a crystalline substance more than an amorphous substance; and
a second region which includes, in per unit area having a size of 100 μmφ or more, an amorphous substance more than a crystalline substance,
wherein the three-dimensional manufactured object includes a first portion and a second portion, the first portion is a major portion of the three-dimensional manufactured object, the second portion is arranged between the first portion and a surface of the three-dimensional manufactured object, the first portion includes the first region, and the second portion includes the second region,
wherein the amorphous substance of the second region and the crystalline substance of the first region contain an inorganic compound in common, and
wherein the first region has a phase-separated structure having two or more phases.

2. The three-dimensional manufactured object according to claim 1, wherein the inorganic compound is an oxide.

3. The three-dimensional manufactured object according to claim 1, wherein the surface of the three-dimensional manufactured object includes the second region.

4. The three-dimensional manufactured object according to claim 1, wherein the three-dimensional manufactured object has a concave portion formed by the second region.

5. The three-dimensional manufactured object according to claim 1, wherein the three-dimensional manufactured object has a convex portion formed by the first region.

6. The three-dimensional manufactured object according to claim 1, wherein a crystalline percentage of the first region is 80 vol % or more.

7. The three-dimensional manufactured object according to claim 6, wherein an amorphous percentage of the second region is 70 vol % or more.

8. The three-dimensional manufactured object according to claim 1, wherein the inorganic compound is aluminum oxide.

9. The three-dimensional manufactured object according to claim 1, wherein the inorganic compound is zirconium oxide.

10. The three-dimensional manufactured object according to claim 1, wherein the inorganic compound is silicon oxide.

11. The three-dimensional manufactured object according to claim 1, wherein the inorganic compound is a rare earth oxide.

12. The three-dimensional manufactured object according to claim 1, wherein first region has an eutectic composition.

13. The three-dimensional manufactured object according to claim 1, wherein a thickness of the three-dimensional manufactured object is more than 20 μm.

14. The three-dimensional manufactured object according to claim 1, wherein 80 vol % or more of the three-dimensional manufactured object is formed of the first region.

15. The three-dimensional manufactured object according to claim 1, wherein the first portion of the three-dimensional manufactured object is formed by a plurality of layers bonded to each other.

16. The three-dimensional manufactured object according to claim 1, wherein the three-dimensional manufactured object has void portions.

17. The three-dimensional manufactured object according to claim 1, wherein the three-dimensional manufactured object is produced in a direct-manufacturing system.

18. The three-dimensional manufactured object according to claim 1, wherein the three-dimensional manufactured object is produced by a bed fusion method.

19. A three-dimensional manufactured object comprising:

a first region which includes, in per unit area having a size of 100 μmφ or more, a crystalline substance more than an amorphous substance; and a second region which includes, in per unit area having a size of 100 μmφ or more, an amorphous substance more than a crystalline substance, wherein the three-dimensional manufactured object includes a first portion and a second portion, the first portion is a major portion of the three-dimensional manufactured object, the second portion is arranged between the first portion and a surface of the three-dimensional manufactured object, the first portion includes the first region, and the second portion includes the second region, wherein the amorphous substance of the second region and the crystalline substance of the first region contain an inorganic compound in common, and wherein first region has an eutectic composition.

20. A three-dimensional manufactured object comprising:

a first region which includes, in per unit area having a size of 100 μmφ or more, a crystalline substance more than an amorphous substance; and a second region which includes, in per unit area having a size of 100 μmφ or more, an amorphous substance more than a crystalline substance, wherein the three-dimensional manufactured object includes a first portion and a second portion, the first portion is a major portion of the three-dimensional manufactured object, the second portion is arranged between the first portion and a surface of the three-dimensional manufactured object, the first portion includes the first region, and the second portion includes the second region, wherein the amorphous substance of the second region and the crystalline substance of the first region contain an inorganic compound in common, and wherein 80 vol % or more of the three-dimensional manufactured object is formed of the first region.

* * * * *